(12) United States Patent
Schwandt et al.

(10) Patent No.: US 9,985,408 B2
(45) Date of Patent: May 29, 2018

(54) GAS-LASER EXCITATION

(71) Applicant: TRUMPF Laser- und Systemtechnik GmbH, Ditzingen (DE)

(72) Inventors: Markus Schwandt, Korntal-Muenchingen (DE); Gerold Mahr, Korntal-Muenchingen (DE); Stefan Knupfer, Hoefingen (DE); Sergej Friesen, Ditzingen (DE)

(73) Assignee: TRUMPF Laser—und Systemtechnik GmbH, Ditzingen (DE)

( * ) Notice: Subject to any disclaimer, the term of this patent is extended or adjusted under 35 U.S.C. 154(b) by 0 days. days.

(21) Appl. No.: 15/414,934

(22) Filed: Jan. 25, 2017

(65) Prior Publication Data

US 2017/0133814 A1 May 11, 2017

Related U.S. Application Data

(63) Continuation of application No. PCT/EP2015/067393, filed on Jul. 29, 2015.

(30) Foreign Application Priority Data

Aug. 1, 2014 (DE) .................. 10 2014 215 227

(51) Int. Cl.
*H01S 3/038* (2006.01)
*H01S 3/097* (2006.01)
*H01S 3/0971* (2006.01)

(52) U.S. Cl.
CPC .......... *H01S 3/0385* (2013.01); *H01S 3/0971* (2013.01); *H01S 3/09702* (2013.01)

(58) Field of Classification Search
CPC ... H01S 3/0385; H01S 3/0971; H01S 3/09702
See application file for complete search history.

(56) References Cited

U.S. PATENT DOCUMENTS

| 4,035,748 A | 7/1977 | Kusaka et al. |
| 4,035,758 A | 7/1977 | Panke |

(Continued)

FOREIGN PATENT DOCUMENTS

| DE | 4200622 A1 | 7/1992 |
| DE | 4329550 A1 | 3/1995 |

(Continued)

OTHER PUBLICATIONS

International Search Report for corresponding PCT Application No. PCT/EP2015/067390, dated Oct. 14, 2015, 4 pages.

*Primary Examiner* — Xinning Niu
(74) *Attorney, Agent, or Firm* — Fish & Richardson P.C.

(57) ABSTRACT

A gas laser excitation system with an integrated impedance matching circuit, comprises a gas laser electrode, a high-frequency connection line connectable to the gas laser electrode and configured for transmission of high-frequency power to the gas laser electrode, and a shield configured to shield the high-frequency power to be transmitted. The shield is arranged between the high-frequency connection line and the gas laser electrode. The high-frequency connection line interacts with the gas laser electrode and/or the shield in such a way that the resulting impedance changes at least across a section of the high-frequency connection line.

20 Claims, 2 Drawing Sheets

(56) References Cited

U.S. PATENT DOCUMENTS

| | | | | |
|---|---|---|---|---|
| 4,730,333 A | * | 3/1988 | Butenuth | H01S 3/0975 372/35 |
| 4,921,357 A | * | 5/1990 | Karube | H01S 3/0975 372/38.04 |
| 5,353,299 A | * | 10/1994 | Martinen | H01S 3/0315 372/103 |
| 7,605,673 B2 | | 10/2009 | Robotham et al. | |
| 2006/0039440 A1 | | 2/2006 | Schwandt | |
| 2010/0316084 A1 | | 12/2010 | Hauer et al. | |
| 2012/0106586 A1 | | 5/2012 | Villarreal-Saucedo et al. | |
| 2015/0270678 A1 | | 9/2015 | Schwandt et al. | |

FOREIGN PATENT DOCUMENTS

| | | |
|---|---|---|
| DE | 10015699 A1 | 10/2001 |
| DE | 102004039082 A1 | 2/2006 |
| DE | 102012222469 A1 | 6/2014 |
| EP | 0243592 A2 | 11/1987 |
| EP | 0309826 A1 | 4/1989 |
| EP | 0525823 A1 | 2/1993 |
| WO | 0173940 A2 | 10/2001 |
| WO | WO2008118342 A1 | 10/2008 |
| WO | WO2013148530 A2 | 10/2013 |

\* cited by examiner

GAS-LASER EXCITATION

CROSS-REFERENCE TO RELATED APPLICATIONS

This application is a continuation of and claims priority under 35 U.S.C. § 120 to PCT Application No. PCT/EP2015/067393 filed on Jul. 29, 2015, which claims priority to German Application No. 10 2014 215 227.5, filed on Aug. 1, 2014. The entire contents of these priority applications are incorporated herein by reference.

TECHNICAL FIELD

The invention relates to a gas laser excitation arrangement comprising an integrated impedance matching arrangement.

BACKGROUND

High-power lasers having a light power of no less than 500 W can be used in laser processing, for example, for marking metals or non-metals, for cutting, welding and processing materials, e.g., metals.

In order to excite a gas laser, a gas discharge is generally generated. The gas discharge is generally generated by supplying electrical power, in particular often by means of high-frequency (HF) electrical power. The electrical power is supplied by means of electrodes. The high-frequency power is generally coupled in at one or more supply points on the electrode. The electrodes are commonly arranged in pairs, one of the electrodes commonly being at a static potential, in particular at earth potential. An electrical power source, e.g., an HF power source, is connected to the other electrode. A source and a load are connected to a high-frequency connecting line. The power source has an output impedance. The load has a load impedance. To improve the energy transfer from the source to the load, the load impedance has to be matched to the source impedance. This is commonly achieved by means of an additional impedance matching circuit connected between the load and the power source.

SUMMARY

One aspect of the present invention features a gas laser excitation system comprising an integrated impedance matching arrangement (or circuit). The gas laser excitation system comprises:

a. a high-frequency connecting line which can be connected to a power source, b. a gas laser electrode which is connected to the high-frequency connecting line, the high-frequency connecting line being suitable for transferring high-frequency power from the power source to the gas laser electrode, and c. a shield arrangement for shielding the high-frequency power to be transferred, the shield arrangement being arranged between the high-frequency connecting line and the gas laser electrode, d. the high-frequency connecting line interacting with the gas laser electrode and/or the shield arrangement in such a way that the resulting impedance changes at least over a portion of the high-frequency connecting line.

The shield arrangement can be a shield arrangement of the gas laser electrode or a shield arrangement of the high-frequency connecting line. The high-frequency connecting line can interact with the gas laser electrode and/or the shield arrangement, in particular capacitively and/or inductively.

The design according to the invention makes it possible to save on additional components. Thus, simplified impedance matching can be achieved in the gas laser excitation system.

The impedance matching can be carried out by a part of the high-frequency connecting line or the gas laser electrode itself. This therefore results in space-saving and cost-effective impedance matching. The arrangement according to the invention makes impedance matching possible without having to take a power, current or voltage measurement between the impedance matching circuit and the gas laser electrode, which is conventionally considered to be necessary. In the solution according to the invention, it is not necessary to calibrate the impedance matching circuit. Therefore, it is also unnecessary to put into operation and calibrate the impedance matching circuit separately from the laser.

Particularly precise impedance matching can be achieved if the high-frequency connecting line is adapted to the geometry of the gas laser electrode and/or the shield arrangement. As a result, the high-frequency connecting line from the power source to the gas laser electrode or supply point on the gas laser electrode can be used simultaneously for impedance matching.

At least one portion of the high-frequency connecting line can be arranged at a defined distance from, in particular in parallel with, the gas laser electrode, in particular in parallel in the longitudinal direction of the gas laser electrode. This results in a particularly space-saving arrangement of the high-frequency connecting line.

The gas electrode can be, at least in part, part of the impedance matching arrangement.

When this is the case, the impedance matching arrangement has a particularly compact design.

Alternatively or additionally, the gas electrode can be, at least in part, part of the high-frequency connecting line.

The gas laser electrode can be connected to earth.

The defined distance between the portion of the high-frequency connecting line and the gas laser electrode can be determined in different ways. In particular, the defined distance may be no higher than 10 cm, in particular no higher than 5 cm, in particular no higher than 1 cm. Alternatively, the defined distance may be no more than $\frac{1}{5}$, in particular no more than $\frac{1}{10}$, of the wavelength of the high-frequency power for which the impedance matching arrangement is designed.

In another alternative, the defined distance may be no more than half, in particular no more than $\frac{1}{5}$, in particular no more than $\frac{1}{10}$, of the length of the high-frequency connecting line in the portion.

Furthermore, the defined distance may be such that a high-frequency electric field is created between the high-frequency connecting line and the gas laser electrode when high-frequency power is conducted to the high-frequency connecting line. In this case, a high-frequency electric field is not created or only a small high-frequency electric field is created outside of the portion.

Alternatively or in addition, at least one region of the surface of the high-frequency connecting line can be coplanar or concentric with respect to a region of the surface of the gas laser electrode or to a region of the surface of the shield arrangement.

Advantageously, more than 50% of the surface, in particular substantially the entire surface, preferably the entire surface, of the high-frequency connecting line can be coplanar or concentric with respect to a region of the surface of the gas laser electrode or to a region of the surface of the shield arrangement.

At least portions of the high-frequency connecting line can be arranged in a hollow-cylindrical gas laser electrode. This can thus result in a concentric arrangement, which results in a space-saving arrangement of the high-frequency connecting line.

The thickness, the diameter or the width of the high-frequency connecting line can change, in particular can become smaller towards the gas laser electrode, at least in the region which is arranged in parallel with the gas laser electrode or the shield arrangement. When one of these variables changes, impedance matching can be carried out owing to the design of the high-frequency connecting line. Additional matching elements can be dispensed with.

The thickness, the diameter or the width of the high-frequency connecting line can change steadily or in steps. In this case, the diameter, the thickness or the width can change steadily in a region of a stepped change. Therefore, changing the diameter, the thickness or the width does not take place suddenly, but steadily. Good impedance matching can be achieved thereby.

The high-frequency connecting line can comprise an outer conductor which is used as the gas laser electrode. These features, too, make it possible to save on components.

The high-frequency connecting line can comprise an outer conductor which is formed as a shield. This shield can be part of the shield arrangement. The shield arrangement and/or the shield can be connected to earth.

Further advantages result when the impedance matching arrangement is arranged outside the chamber in which the laser gas is present.

In a first region, in which both a portion of the high-frequency connecting line and a portion of the gas laser electrode are arranged, the shield arrangement can be provided between the high-frequency connecting line and the gas laser electrode, the shield arrangement also extending into a second region in which only a second portion of the gas laser electrode is arranged. This feature makes it possible for the electric field, and thus the discharge region, to propagate along the electrode surface symmetrically to the supply location(s), and therefore a gas temperature which is as uniform as possible can be set. A supply location can comprise one or more supply points or one supply region.

Further features and advantages of the invention can be found in the following description of an embodiment of the invention, by way of the drawings which show details essential to the invention, and from the claims. The individual features may each be implemented in isolation or together in any desired combination in a variant of the invention.

A preferred embodiment of the invention is shown schematically in the drawings and is described in greater detail in the following with reference to the drawings.

DETAILED DESCRIPTION

Figure 1:
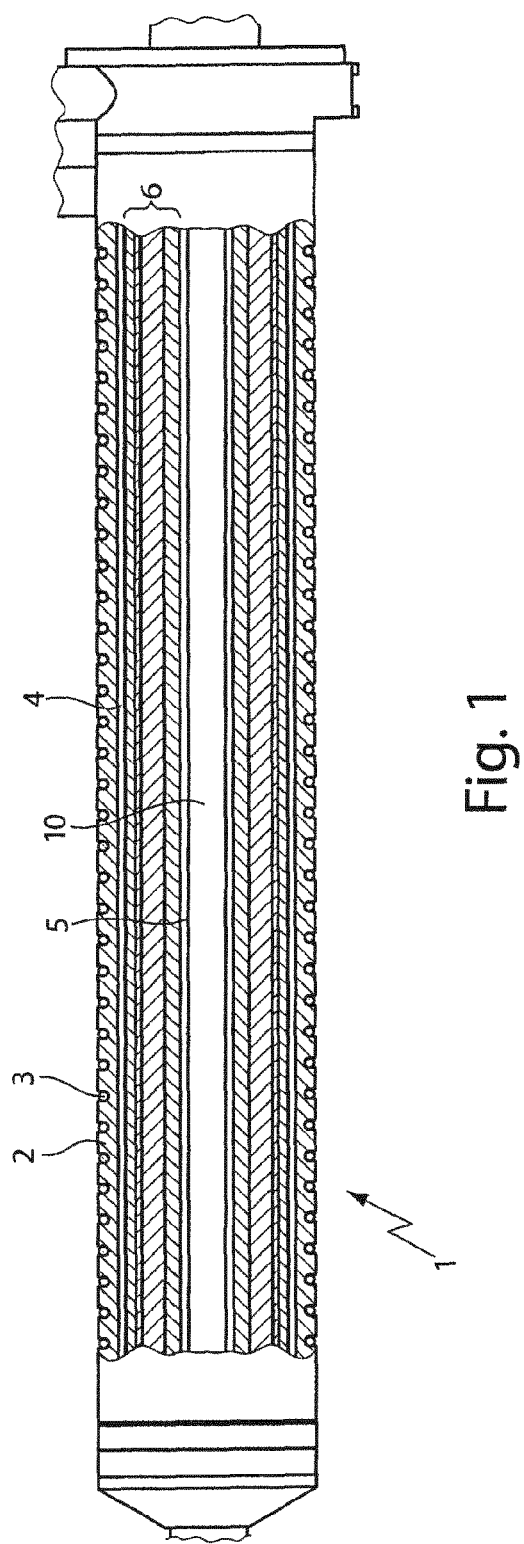
FIG. 1 is a partial sectional view of an example diffusion-cooled gas laser excitation arrangement.

FIG. 1 is a partial sectional view of a diffusion-cooled gas laser excitation arrangement 1. The gas laser excitation arrangement 1 comprises an outer gas laser electrode 2 in which cooling pipes 3 for a coolant are arranged. The outer gas laser electrode 2 is made of metal and is connected to earth. The discharge gap 4 is directly below the gas laser electrode 2. The second gas laser electrode is denoted by reference numeral 5.

A dielectric 6 is located above the second gas laser electrode 5 and can be constructed from a plurality of different layers of material. In the embodiment shown, power is supplied centrally, based on the length of the gas laser electrode 5, at the location 10.

Figure 2:
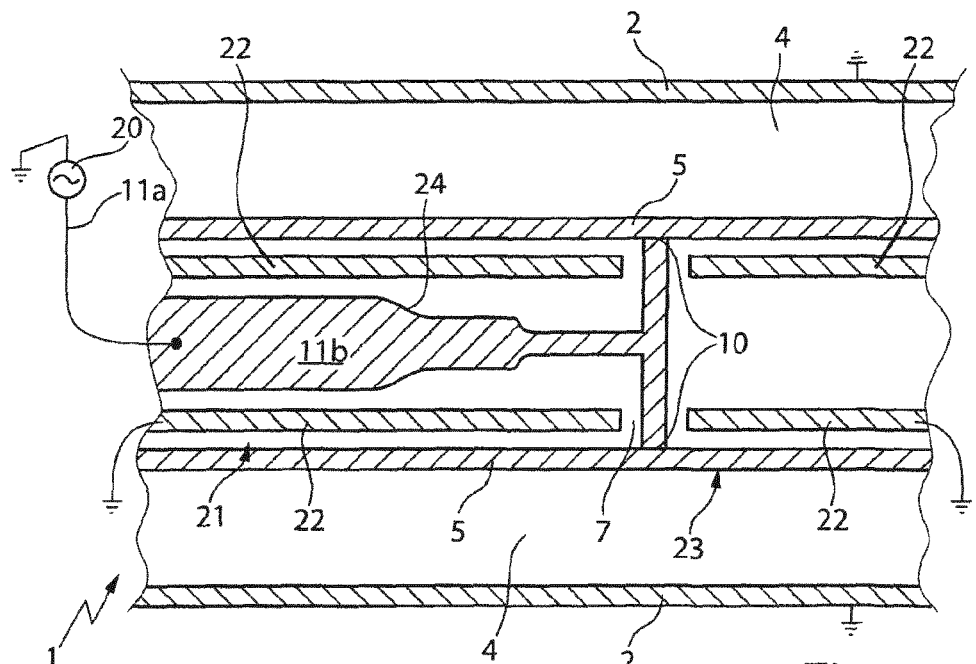
FIG. 2 is an enlarged view of the gas laser excitation arrangement of FIG. 1 in the region of a supply location.

It can be seen in the enlarged view of FIG. 2 that the discharge gap 4 is between the gas laser electrode 2 and the gas laser electrode 5. In this case, the gas laser electrodes 2 and 5 are arranged coaxially with one another. A high-frequency connecting line 11a, 11b is connected to a power source 20, which generates high-frequency power. The portion 11b of the high-frequency connecting line extends inside the gas laser electrode 5 and substantially in parallel with the extension direction thereof. A shield 22 is provided in a first region 21 between the connecting line 11b and the gas laser electrode 5. The shield 22 comprises, in the region of the supply location 10, a recess 7 through which the high-frequency connecting line 11b is guided to the gas laser electrode 5. The shield 22 is also provided in a second region 23. However, there is no high-frequency connecting line in this region 23. The shield 22 is connected to earth just like the gas laser electrode 2. The shield 22 is part of a shield arrangement which can additionally comprise a shield 22 of the high-frequency connecting line 11a. In the embodiment shown, the gas laser electrode 5, shield 22 and portion 11b of the high-frequency connecting line extend substantially in parallel with one another. The shield 22 extends in parallel with the gas laser electrode 5 in the second region 23 too.

This arrangement means that the electric field can be distributed along the electrode surface symmetrically to the supply location 10 in a discharge region (discharge gap 4). The gas laser electrode 5 is decoupled from the high-frequency supply, in particular the high-frequency connecting line 11b, by the shield 22. In this case, the shield 22 is provided not only in the region of the high-frequency supply, but also in the entire discharge region. The high-frequency supply and the discharge geometry are decoupled from one another in this manner. Therefore, the shield 22 is provided not only to the left of the supply location 10, but also to the right of the supply location 10. Both earth and the high-frequency supply have a local potential that is different from the actual gas laser electrode 5. In order to suppress this interaction, the shield 22 is used along the entire surface of the electrode 5.

The diameter of the part of the high-frequency connecting line 11b which extends in parallel and coaxially with the gas laser electrode 5 and the shield 22 becomes smaller in steps approaching the supply location 10. However, the transition from one diameter to another diameter is steady, as can be seen at the location 24. Owing to the arrangement and geometric design, in particular owing to a defined distance between the high-frequency connecting line 11b and the gas laser electrode 5, impedance matching takes place along the high-frequency connecting line in the region 21. The gas laser electrode 5, shield 22 and high-frequency connecting line 11b thus form an impedance matching arrangement.

Figure 3:
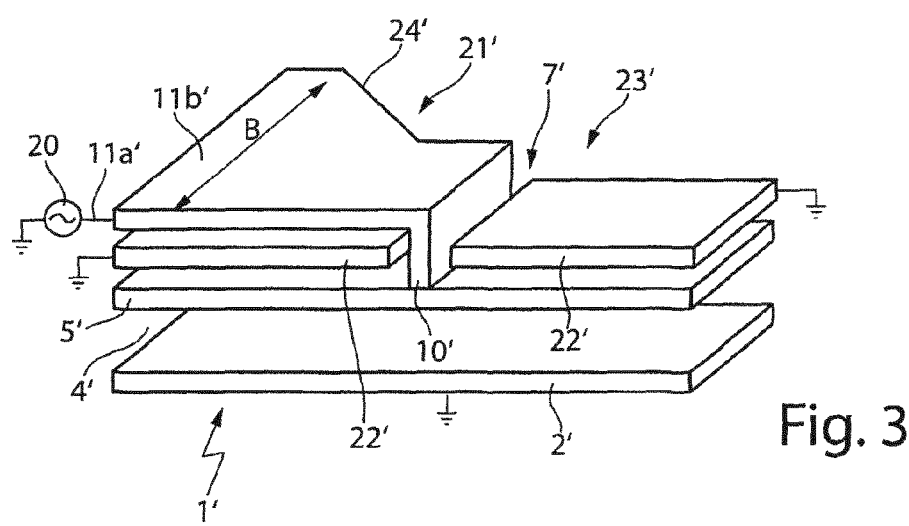
FIG. 3 is a schematic view an example gas laser excitation arrangement in the form of a slab laser.

FIG. 3 shows a gas laser excitation arrangement 1' in the form of a slab laser. A discharge gap 4' is located between a gas laser electrode 2', which is connected to earth, and a gas laser electrode 5'. The gas laser electrode 5' is connected to the power source 20 via a high-frequency connecting line 11a', 11b'. In a first region 21', a shield 22', which is connected to earth, is provided between the portion 11b' of the high-frequency connecting line and the gas laser electrode 5'. On the right-hand side of the supply location 10', it is only the shield 22' that is provided and not a high-frequency connecting line. Therefore, only the shield 22' and part of the gas laser electrode 5' are provided in the region 23'. The shield 22' comprises a recess 7' through which the gas laser electrode 5' can be contacted. It can be seen that the width B of the high-frequency connecting line 11b' becomes smaller in steps approaching the feed-in location 10'. However, the transition between the steps is steady, as can be seen at the point 24'. This results in impedance matching. The design and arrangement of the shield 22' and the gas laser electrode 5' also contribute thereto. In particular, the gas laser electrode 5' and the shield 22' are arranged at a defined distance. The gas laser electrode 5', the shield 22' and the high-frequency connecting line 11b' form an impedance matching arrangement.

A number of embodiments of the invention have been described. Nevertheless, it will be understood that various modifications may be made without departing from the spirit and scope of the invention. Accordingly, other embodiments are within the scope of the following claims.

What is claimed is:

1. A gas laser excitation system having an integrated impedance matching circuit, the system comprising:
   a gas laser electrode;
   a high-frequency connecting line connected to the gas laser electrode and configured to transfer high-frequency power to the gas laser electrode; and
   a shield arranged between the high-frequency connecting line and the gas laser electrode and configured to shield the high-frequency power to be transferred,
   wherein the high-frequency connecting line is configured to interact with at least one of the gas laser electrode or the shield such that an impedance over at least a portion of the high-frequency connecting line changes.

2. The gas laser excitation system of claim 1, wherein the high-frequency connecting line is adapted to at least one of a geometry of the gas laser electrode or a geometry of the shield.

3. The gas laser excitation system of claim 1, wherein at least one portion of the high-frequency connecting line is arranged at a defined distance with the gas laser electrode.

4. The gas laser excitation system of claim 3, wherein the at least one portion of the high-frequency connecting line is in parallel with the gas laser electrode.

5. The gas laser excitation system of claim 3, wherein the defined distance is no more than a percentage of a length of the at least one portion of the high-frequency connecting line, and wherein the percentage is 50%, 20%, or 10%.

6. The gas laser excitation system of claim 3, wherein the defined distance is determined such that a high-frequency electric field is created between the high-frequency connecting line and the gas laser electrode when the high-frequency power is conducted by the high-frequency connecting line.

7. The gas laser excitation system of claim 1, wherein at least a part of the gas laser electrode is part of the impedance matching circuit.

8. The gas laser excitation system of claim 1, wherein at least a part of the gas laser electrode is part of the high-frequency connecting line.

9. The gas laser excitation system of claim 1, wherein the impedance matching circuit comprises at least a part of the high-frequency connecting line and at least a part of the shield.

10. The gas laser excitation system of claim 1, wherein at least one region of an entire surface of the high-frequency connecting line is co-planar or concentric with respect to one of a region of a surface of the gas laser electrode and a region of a surface of the shield.

11. The gas laser excitation system of claim 10, wherein the at least one region is more than 50% of the entire surface of the high-frequency connecting line.

12. The gas laser excitation system of claim 1, wherein at least one region of the high-frequency connecting line is in parallel with the gas laser electrode or the shield, and
   wherein a diameter or width of the high-frequency connecting line changes in the at least one region.

13. The gas laser excitation system of claim 12, wherein the diameter or width of the high-frequency connecting line becomes smaller approaching the gas laser electrode.

14. The gas laser excitation system of claim 1, wherein the gas laser electrode comprises a hollow-cylindrical gas laser electrode, and at least one portion of the high-frequency connecting line is arranged in the hollow-cylindrical gas laser electrode.

15. The gas laser excitation system of claim 1, wherein the high-frequency connecting line comprises an outer conductor configured to be the gas laser electrode.

16. The gas laser excitation system of claim 1, wherein the high-frequency connecting line comprises an outer conductor formed as the shield.

17. The gas laser excitation system of claim 1, wherein the shield is connected to earth.

18. The gas laser excitation system of claim 1, wherein the shield comprises a recess through which the high-frequency connecting line is connected to the gas laser electrode at a supply location.

19. The gas laser excitation system of claim 18, wherein a width of the high-frequency connecting line becomes smaller approaching the supply location.

20. The gas laser excitation system of claim 18, wherein, on a left side of the supply location, a first portion of the shield is provided between the high-frequency connecting line and a first part of the gas laser electrode, and
   wherein, on a right side of the supply location, a second portion of the shield and a second part of the gas laser electrode are provided, with no high-frequency connecting line between the second portion of the shield and the second part of the gas laser electrode.

* * * * *

UNITED STATES PATENT AND TRADEMARK OFFICE
CERTIFICATE OF CORRECTION

PATENT NO. : 9,985,408 B2
APPLICATION NO. : 15/414934
DATED : May 29, 2018
INVENTOR(S) : Markus Schwandt et al.

Page 1 of 1

It is certified that error appears in the above-identified patent and that said Letters Patent is hereby corrected as shown below:

On the Title Page

Column 1 (Assignee), Line 1, delete "Laser—und" and insert -- Laser- und --

Column 1 (Notice), Line 3, after "0 days." delete "days."

Signed and Sealed this
Tenth Day of July, 2018

Andrei Iancu
*Director of the United States Patent and Trademark Office*